United States Patent
Yang et al.

(10) Patent No.: US 8,410,774 B2
(45) Date of Patent: Apr. 2, 2013

(54) ELECTROMAGNETIC MOTION SENSOR

(75) Inventors: Yu-Qiu Yang, Shenzhen (CN); Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 442 days.

(21) Appl. No.: 12/874,180

(22) Filed: Sep. 1, 2010

(65) Prior Publication Data

US 2011/0234209 A1    Sep. 29, 2011

(30) Foreign Application Priority Data

Mar. 26, 2010    (CN) .................. 2010 1 01336098

(51) Int. Cl.
*G01B 7/14*    (2006.01)
(52) U.S. Cl. .............................. 324/207.15; 324/207.11
(58) Field of Classification Search .................. None
See application file for complete search history.

(56) References Cited

U.S. PATENT DOCUMENTS

| | | | |
|---|---|---|---|
| 6,067,858 A * | 5/2000 | Clark et al. ................ 73/504.16 |
| 6,296,779 B1 * | 10/2001 | Clark et al. ..................... 216/66 |
| 2004/0181360 A1 * | 9/2004 | Fukushima et al. .......... 702/152 |
| 2007/0001665 A1 * | 1/2007 | Reiffel ..................... 324/207.15 |
| 2007/0299623 A1 * | 12/2007 | Gandelsman et al. ......... 702/95 |

* cited by examiner

*Primary Examiner* — Vinh Nguyen
(74) *Attorney, Agent, or Firm* — Altis Law Group, Inc.

(57) ABSTRACT

An electromagnetic motion sensor includes a base, an electromagnetic induction layer, a block, and an emitting coil. The electromagnetic induction layer with a plurality of induction coils is arranged on the bottom of the base. The block is movably connected to the base by a plurality of elastic members. The emitting coil is fixed to a center of the bottom of the block facing the induction layer. A circuit inside the block provides current to the emitting coil. The block moves with the jerk of the motion sensor when the motion sensor is jerked, causing the elastic members to be distorted. The relative movement between the block and the magnetic induction layer causes more than one of the induction coils generate and output voltage signals according to the change of magnetic flux through the plurality of induction coils caused by the moving of the emitting coil.

7 Claims, 5 Drawing Sheets

ELECTROMAGNETIC MOTION SENSOR

1. TECHNICAL FIELD

The present disclosure relates to electromagnetic motion sensors.

2. DESCRIPTION OF RELATED ART

Nowadays, many portable electronic devices are equipped with motion sensors to detect the movement of the electronic devices. For example, an acceleration sensor can be used to detect the movement direction and acceleration of the electronic device. An acceleration sensor usually needs to adopt Micro-electromechanical Systems (MEMS) technology to manufacture its suspended structure. The suspended structure is complex and difficult to manufacture.

BRIEF DESCRIPTION OF THE DRAWINGS

The components of the drawings are not necessarily drawn to scale, the emphasis instead being placed upon clearly illustrating the principles of an electromagnetic motion sensor. Moreover, in the drawings, like reference numerals designate corresponding parts throughout several views.

DETAILED DESCRIPTION

Figure 1:
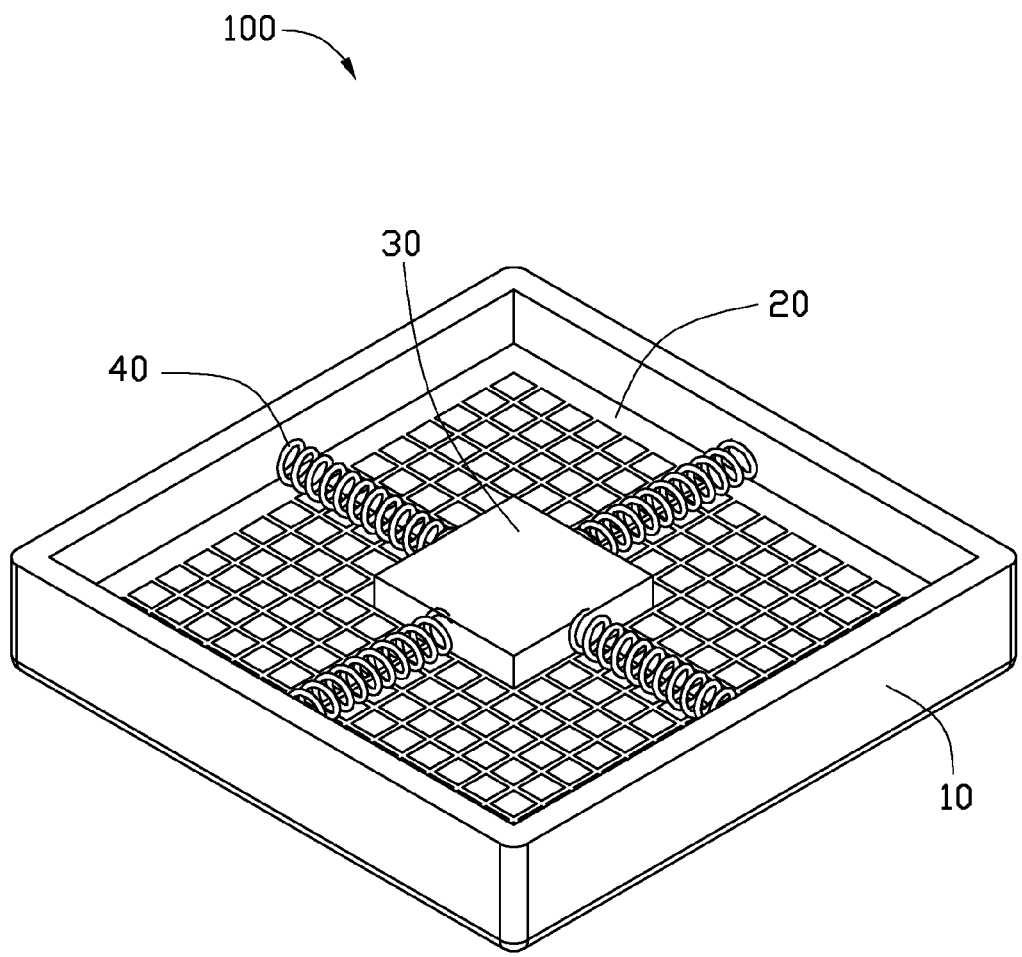
FIG. 1 is an isometric, assembled view of an electromagnetic motion sensor in accordance with an exemplary embodiment.

FIG. 1 is an isometric, assembled view of an electromagnetic motion sensor 100. The electromagnetic motion sensor 100 includes a base 10, an electromagnetic induction layer 20, and a magnetic field emission member 30 movably connected to the base 10 by a number of elastic members 40.

Figure 2:
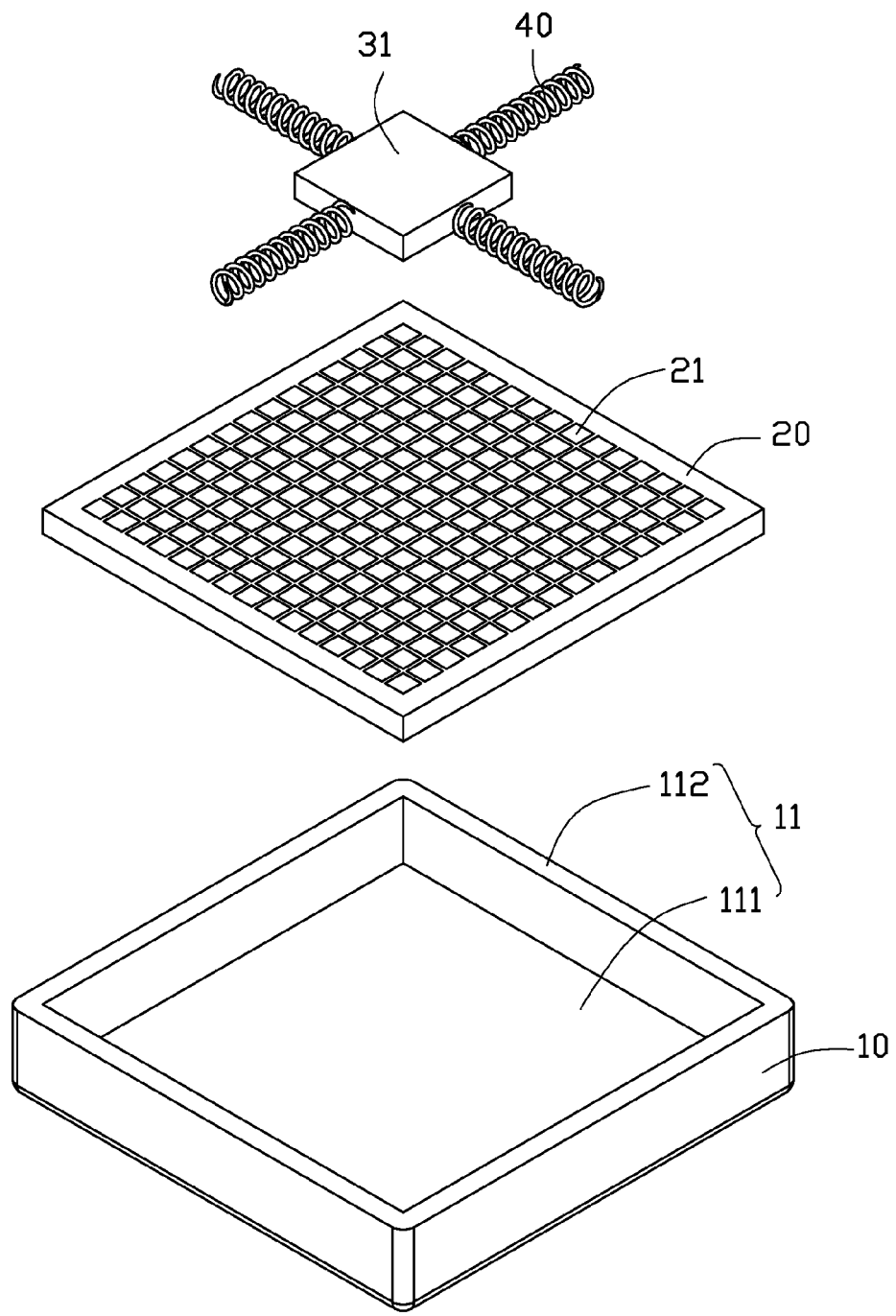
FIG. 2 is an exploded perspective view of the electromagnetic motion sensor in FIG. 1.

Referring to FIG. 2, the base 10 includes a bottom 111, and four side walls 112 protruding from the bottom plate 111, cooperatively defining a receiving space 11 with the base 10.

The electromagnetic induction layer 20 is arranged on the bottom 111. A plurality of induction coils 21 are arranged on the induction layer 20 in a matrix form.

The magnetic field emission member 30 includes a movable block 31. In this instance, the block 31 is rectangular and includes four sidewalls (not labeled). The block 31 is in the center of the receiving space 11 of the base 10. A circuit (not shown) is arranged inside the block 31.

Figure 4:
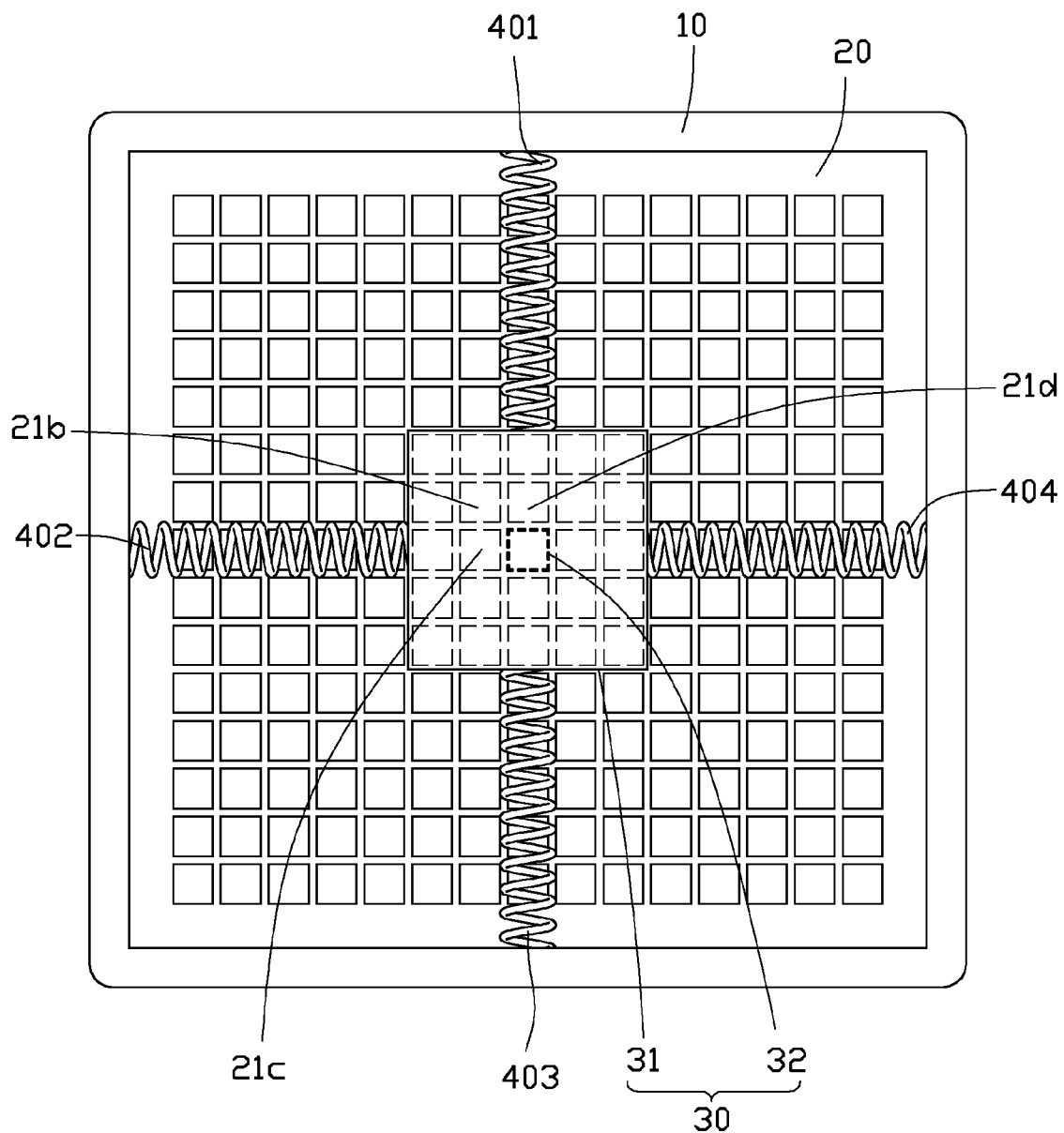
FIG. 4 is a schematic diagram illustrating the electromagnetic motion sensor in a static state.

Referring to FIG. 4, the magnetic field emission member 30 also includes an emitting coil 32. The emitting coil 32 is fixed to a center of the bottom of the block 31, facing the electromagnetic induction layer 20. The emitting coil 32 includes a first output terminal and a second output terminal connected to the circuit inside the block 31. The circuit inside the block 31 provides current to the emitting coil 32. According to Ampere's law, the emitting coil 32 generates a magnetic field when current flows in the emitting coil 32. The direction of the magnetic field is substantially perpendicular to the emitting coil 32.

In the embodiment, the plurality of elastic members 40 is four. Each of the elastic members 40 are respectively fixed between the sidewall of the block 31 and the sidewall 112 of the base 10, causing the block 31 to suspend above the electromagnetic induction layer 20. The elastic members 40 can be coil springs.

The block 31 moves with the jerk of the motion sensor 100 when the electromagnetic motion sensor 100 is jerked, causing the elastic members 40 to be distorted. After the jerk has ceased, the elastic members 40 rebound to move the block to its original position. The relative movement between the block 31 and the magnetic induction layer 20 causes more than one of the induction coils 21 to generate and output voltage signals according to the change of magnetic flux through the plurality of induction coils 21 caused by the movement of the emitting coil 32.

Figure 3:
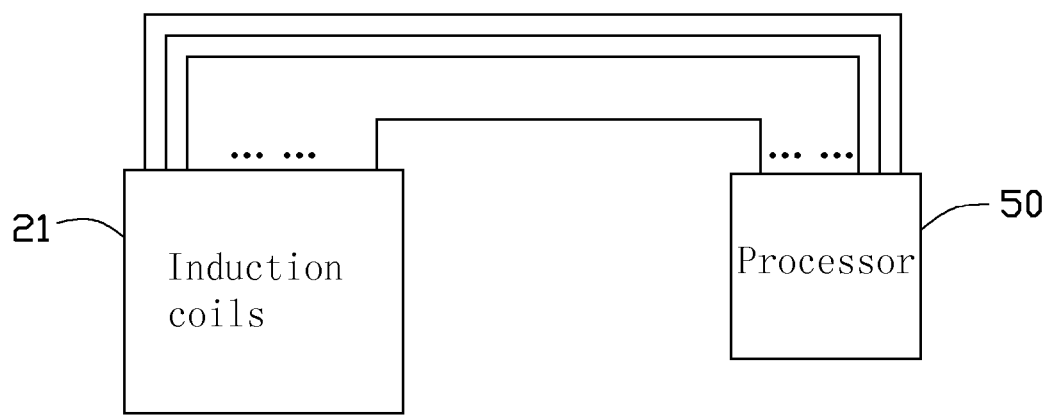
FIG. 3 is a schematic diagram illustrating the connection of a electromagnetic induction layer with a processor of the electromagnetic motion sensor in FIG. 1.

Referring to FIG. 3, the electromagnetic motion sensor 100 also includes a processor 50 connected to the plurality of induction coils 21. The processor 50 is used to receive the voltage signals from the induction coils 21, and determine the movement direction of the electromagnetic motion sensor 100 based on the sequence of voltage signals output to the processor 50, which will be described in more detail later.

Figure 5:
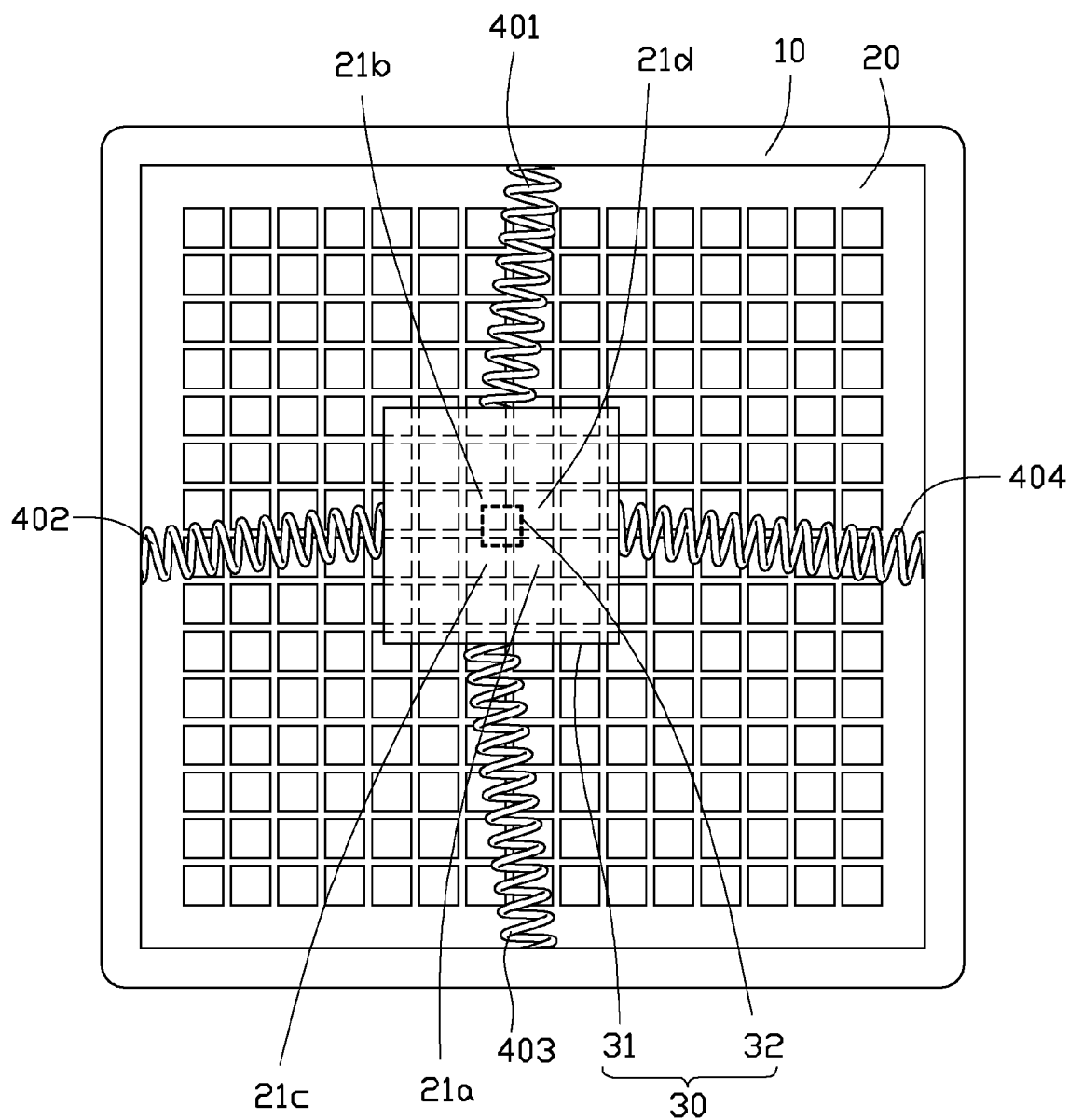
FIG. 5 is a schematic diagram illustrating the electromagnetic motion sensor in a working state.

Referring to FIGS. 4-5, normally, an induction coil 21a is located in the center of the electromagnetic induction layer 20 by four coil spring 401, 402, 403 and 404, and the emitting coil 32 is located above the induction coil 21a. When the electromagnetic motion sensor 100 is jerked or is shaken along a predetermined direction, the block 31 moves, and passes the induction coils 21b, 21c, and 21d. The induction coils 21b, 21c, and 21d thus respectively generate three voltage signals Ua, Ub and Uc. The movement direction of the block 31 is substantially opposite to the movement direction of the motion sensor 100. The processor 50 determines that the block 31 is passing the induction coils 21b, 21c, and 21d in turn according to the sequence of receiving the voltage signals Ua, Ub and Uc. The movement direction of the motion sensor 100, which is opposite to the movement direction of the block 31, can also be determined.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electromagnetic motion sensor comprising:
    a base;
    an electromagnetic induction layer arranged on the base;
    a plurality of induction coils arranged on the induction layer; and
    a magnetic field emission member comprising:
        a block with a circuit movably connected to the base by a plurality of elastic members;
        an emitting coil fixed to a center of the bottom of the block, facing the electromagnetic induction layer, wherein the circuit provides current to the emitting coil to generate a magnetic field;
    wherein the block moves with the jerk of the motion sensor when the motion sensor is jerked, causing the elastic members to be distorted, the relative movement between the block and the magnetic induction layer causes more than one of the induction coils to generate and output voltage signals according to the change of magnetic flux through the plurality of induction coils caused by the moving of the emitting coil.

2. The electromagnetic motion sensor as claimed in claim 1, wherein the electromagnetic motion sensor also comprises a processor connected to the plurality of induction coils, the processor is configured to receive the voltage signals from the induction coils, and determine the movement direction of the electromagnetic motion sensor based on the sequence of the induction coils generating and outputting voltage signals.

3. The electromagnetic motion sensor as claimed in claim 1, wherein the base comprises a bottom, and four side walls protruding from the bottom plate, cooperatively defining a receiving space with the bottom.

4. The electromagnetic motion sensor as claimed in claim 3, wherein the block is rectangular and includes four sidewalls, and the block is in a center of the receiving space of the base.

5. The electromagnetic motion sensor as claimed in claim 4, wherein the number of the plurality of elastic members is four, each of the elastic members is respectively fixed between a sidewall of the block and a sidewall of the base, causing the block to suspend above the electromagnetic induction layer 20.

6. The electromagnetic motion sensor as claimed in claim 1, wherein the emitting coil comprises a first output terminal and a second output terminal both connected with the circuit.

7. The electromagnetic motion sensor as claimed in claim 1, wherein the elastic members are coil springs.

\* \* \* \* \*